United States Patent [19]

Jones, Jr.

[11] 3,795,867

[45] Mar. 5, 1974

[54] PULSE DETECTION ARRANGEMENT

[75] Inventor: Leo V. Jones, Jr., Chicago, Ill.

[73] Assignee: GTE Automatic Electric Laboratories Incorporated, Northlake, Ill.

[22] Filed: Apr. 2, 1973

[21] Appl. No.: 347,302

[52] U.S. Cl.................. 328/133, 328/110, 328/120
[51] Int. Cl. .......................................... H03d 13/00
[58] Field of Search .... 328/133, 134, 109, 110, 120

[56] References Cited
UNITED STATES PATENTS

| | | | |
|---|---|---|---|
| 3,069,623 | 12/1962 | Murgio | 328/134 X |
| 3,233,180 | 2/1966 | Eddy | 328/134 |
| 3,441,342 | 4/1969 | Ball et al. | 328/134 X |
| 3,501,701 | 3/1970 | Reid | 328/134 |
| 3,514,705 | 5/1970 | Feigleson | 328/133 |
| 3,515,997 | 6/1970 | Babany | 328/134 |
| 3,588,710 | 6/1971 | Masters | 328/133 |

Primary Examiner—John S. Heyman
Attorney, Agent, or Firm—Bernard E. Franz

[57] ABSTRACT

A pulse detection arrangement indicates the malfunctioning of a pair of timing generators producing a series of first and second synchronously recurring timing pulses by generating a stuck-at-one pulse when either one of the first or second pulses is generated and remains in a true condition as a result of a malfunction, and by generating a stuck-at-zero signal when either one of the timing pulses fails to be generated. The arrangement includes a zero bi-stable device responsive to the absence of both of the first and second pulses to generate a zero state pulse, a first bi-stable device responsive to either one of the first or second pulses and to the zero state pulse for generating a state one pulse, the state one pulse causing the zero bi-stable device to terminate its zero state pulse, a second bi-stable device responsive to the coincidence of the first pulse and the second pulse and to the state one pulse for generating a state two pulse, the state two pulse causing the first bi-stable device to terminate its state one pulse upon the lack of coincidence of the first and second pulses, the second bi-stable device terminating its state two pulse upon the occurrence of the state zero pulse or upon the coincidence of the first and second pulses and of the termination of the state one pulse, and a logic circuit for generating the stuck-at-one pulse in response to the absence of the state zero pulse and to the absence of the state one pulse and of the state two pulse after a predetermined time interval, the logic circuit generating the stuck-at-zero pulse in response to the state one pulse after a predetermined timing interval.

9 Claims, 2 Drawing Figures

PULSE DETECTION ARRANGEMENT

BACKGROUND OF THE INVENTION

1. Field of the Invention

This invention relates to a data processor system pulse detection arrangement for detecting the malfunctioning of a pair of recurring synchronously generated timing pulses from a pair of data processors.

2. Description of the Prior Art

Data processing systems employing a pair of data processors operating in synchronism have been employed for reliability and maintenance purposes. Each one of the duplicated pair of data processors includes a timing generator for generating synchronously recurring timing pulses. In order to detect malfunctioning of the timing generators, a circuit for monitoring the timing signals would have to be adapted to respond to different modes of failure of the timing generators since either one of the timing generators may fail by not generating the appropriate signal, or by generating the signal and then permitting it to remain in the same condition. In this regard, either one of the timing pulses may remain accidentally in either one of its logic levels. Therefore, it would be highly desirable to have a pulse detection arrangement which determines when either one of a pair of synchronously recurring timing pulses either fails to be generated, or is generated but remains accidentally in the same true condition so that subsequent diagnostic procedures are thereby facilitated to determine the cause of the malfunction.

SUMMARY OF THE INVENTION

The object of this invention is to provide a new and improved pulse detection arrangement which determines whether either one of a pair of synchronously recurring pulses fails to be generated or is generated but remains accidentally in the true condition.

According to the invention, the pulse detection arrangement includes three bi-stable devices for monitoring a pair of synchronously recurring timing pulses generated by a pair of timing generators to determine that the timing pulses can enter and leave sequentially the three possible states of the bi-stable devices. Should one of the signals fail, the three states remain in either one of two signal conditions, the one condition corresponding to the zero fault ("stuck at zero" condition), or the one fault ("stuck at one" condition). The zero bi-stable device of the three devices responds to the absence of both of the first and second pulses to generate a zero state pulse, and a first bi-stable device responds to either one of the first or second pulses and to the zero state pulse for generating a state one pulse, the state one pulse causing the zero bi-stable device to terminate its zero state pulse. A second bi-stable device responds to the coincidence of the first pulse and the second pulse and of the state one pulse for generating a state two pulse, the state two pulse causing the first bi-stable device to terminate its state one pulse upon the lack of coincidence of the first and second pulses, the second bi-stable device terminating its state two pulse upon the occurrence of the state zero pulse or upon the coincidence of the first and second pulses and of the termination of the state one pulse. A logic circuit generates after a predetermined time interval a stuck-at-one pulse in response to the absence of the state zero pulse and to the absence of the state one pulse and of the state two pulse, and generates after a predetermined timing interval a stuck-at-zero pulse in response to the state one pulse.

CROSS-REFERENCES TO RELATED APPLICATIONS

The preferred embodiment of the present invention is incorporated in a system disclosed in a U.S. Pat. application Ser. No. 348,575 filed Apr. 6, 1973 by P. A. Zelinksi and L. V. Jones, for a DATA PROCESSOR SYSTEM DIAGNOSTIC ARRANGEMENT, hereinafter referred to as the DIAGNOSTIC ARRANGEMENT application.

DESCRIPTION OF THE PREFERRED EMBODIMENT

Figure 1:
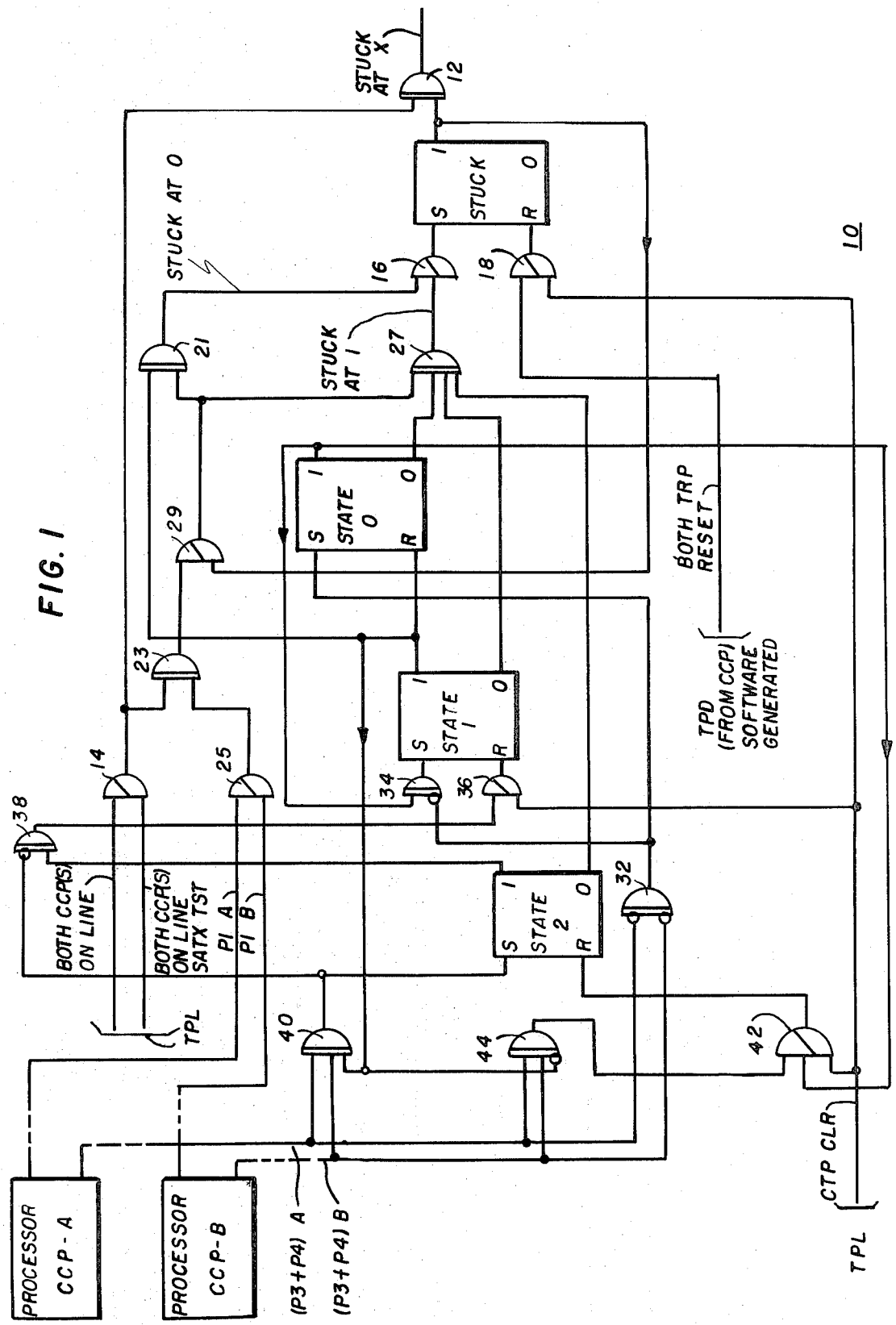
FIG. 1 is a functional block diagram of a pulse detection arrangement of the present invention.
Figure 2:
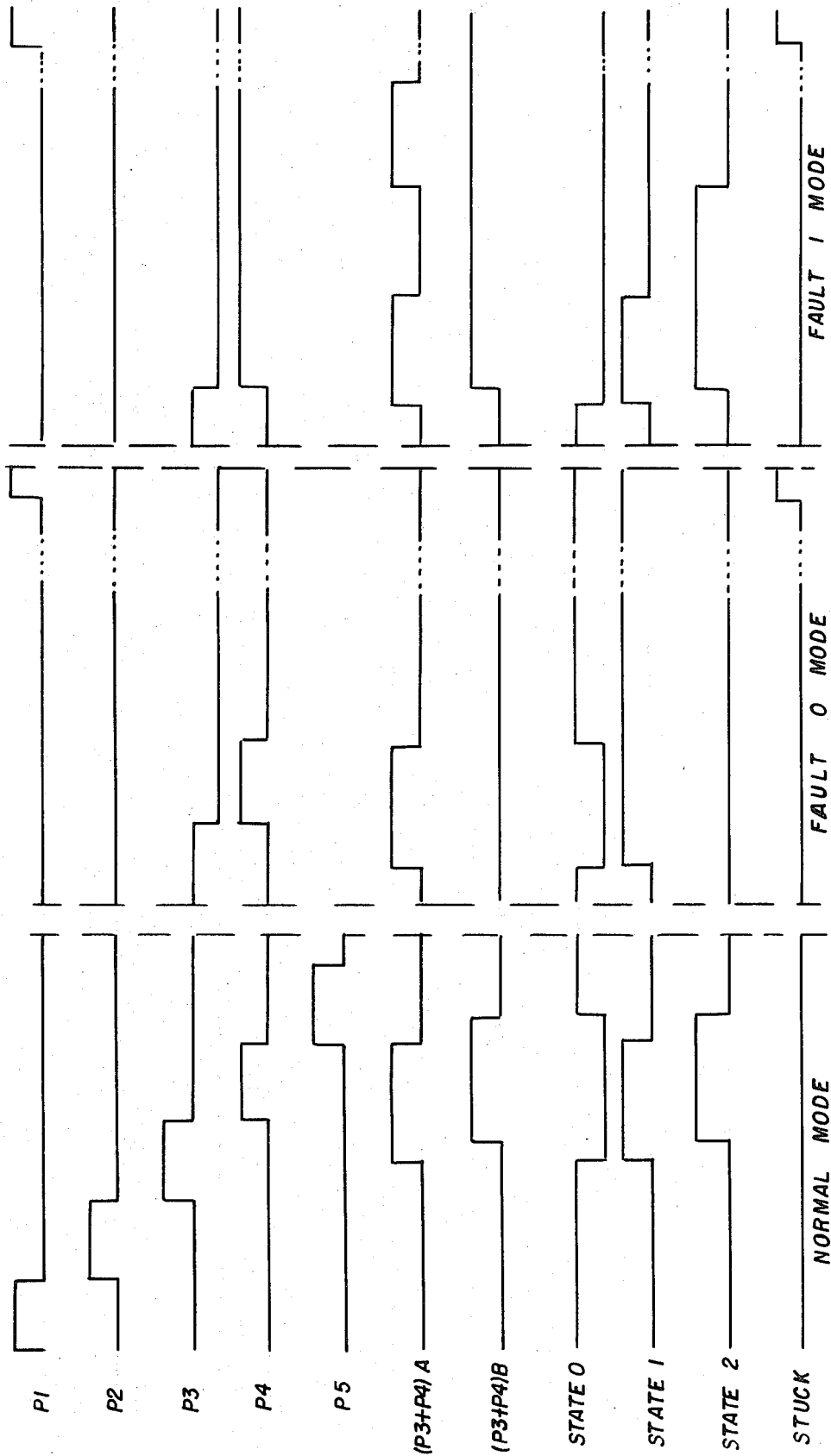
FIG. 2 is a timing diagram of the pulse detection arrangement of FIG. 1.

Referring now to the drawings, and more particularly to FIG. 1 thereof, there is shown a pulse detection arrangement 10 for monitoring a pair of signals (P3+P4)A and (P3+P4)B from the respective pair of computer data processors A and B, the signals being synchronously recurring timing signals from timing generators (not shown) in each one of the processors. As shown in FIG. 2, the timing generators produce, among other timing signals, a set of five recurring basic signals P1 through P5 and a signal P3 + P4 which is derived from the signals P3 and P4. The signals (P3+P4)A and (P3+P4)B from both processors are monitored as being representative signals. The arrangement 10 includes three bi-stable latches STATE 0, STATE 1 and STATE 2 for monitoring the timing signals to detect whether either one of the monitored signals has failed to be generated, or if generated, remains erroneously at a true condition. If either one of the signals fails in either mode, the three states remain in a predictable manner, depending upon which mode of failure has occurred. The latch STATE 0 when set indicates the initial condition where both signals (P3+P4)A and (P3+P4)B are at a false or logic level zero condition. When either one or both of the timing pulses become true, the latch STATE 1 is set and the latch STATE 0 is reset. If both of the timing pulses become true at the same time, the latch STATE 2 is set as soon as the latch STATE 1 is set. When the stuck-at-zero failure mode occurs, one of the timing pulses is not generated and after a predetermined timing interval, all of the latches are reset except the latch STATE 1 to cause a latch STUCK to be set. During a stuck-at-one failure mode, one of the timing pulses is generated but it fails to return to a zero logic level, and after a predetermined timing interval, the latches STATE 1 and STATE 2 are reset as well as the latch STATE 0 to cause the latch STUCK to be set for indicating the malfunction.

Considering now the arrangement 10 in greater detail with reference to FIGS. 1 and 2 of the drawings, a coincidence AND gate 12 generates a signal STUCK AT X in response to the setting of the latch STUCK and the output of an OR gate 14, which in turn is enabled by either the signal BOTH CCPS ON LINE or the signal BOTH CCP(S) ON LINE SATX TST generated by the logic circuit TPL in the DIAGNOSTIC ARRANGEMENT patent application, the former signal indicating that both computer processors are operating in an on-line condition and the latter signal being a test signal. The signal STUCK AT X indicates that one of the monitored signals has either stuck at a zero logic level or a one logic level. An OR gate 16 sets the latch STUCK in response to either the signal STUCK AT 0 during a zero failure mode of operation or a signal STUCK AT 1 during a one failure mode of operation. An OR gate 18 resets the latch STUCK in response to either one of signals BOTH TRP RESET and TP CLR. The signal BOTH TRP RESET represents that both traps are reset which is a software generated signal produced by the data processor units and is locally generated via the third party detection circuit TPD in the DIAGNOSTIC ARRANGEMENT patent application. The signal CTP CLR is locally generated in the third party logic circuit TPL in the DIAGNOSTIC ARRANGEMENT patent application and is a master clear signal for clearing the entire third party circuit in response to software controlled signals from the computer data processor units. A coincidence AND gate 21 generates the signal STUCK AT 0 in response to the one output of the latch STATE 1 and the output of a coincidence AND gate 23, which in turn is enabled by the output of the gate 14 and the output of an OR gate 25 enabled by either one of the signals P1 A or P1 B from the respective processor CCP-A or CCP-B, the letter A or B associated with the signal P1 indicating the processor from which it originates.

A coincidence AND gate 27 generates the signal STUCK AT 1 in response to the zero outputs of the latches STATE 0, STATE 1 and STATE 2. It should be noted that an OR gate 29 enabled initially by the output of the gate 23 remains energized after the latch STUCK is set in response to its one output to maintain either one of the gates 21 or 27 enabled, whereby the latch STUCK remains set for subsequent diagnostic purposes. The latch STATE 0 is set by the output of a coincidence AND gate 32 which is enabled by the absence of both of the timing signals (P3+P4)A and (P3+P4)B, the circles at the inputs to the gate 32 indicating that the inversions of the signals are used to energize the gate 32. The latch STATE 0 is reset by the setting of the latch STATE 1, which in turn is set in response to the output of a coincidence AND gate 34. The gate 34 in turn is enabled in response to the one output of the latch STATE 0 and the gate 32 being de-energized. The latch STATE 1 is reset in response to the energization of the output of an OR gate 36 which in turn is enabled by a coincidence AND gate 38 or the signal CTP CLR. The gate 38 is enabled by the one output of the latch STATE 2 and the de-energization of a coincidence AND gate 40, which in response to the coincidence of the one output of the latch STATE 1 and of the two monitored timing signals (P3+P4)A and (P3+P4)B sets the latch STATE 2. An OR gate 42 resets the latch STATE 2 in response to the clear signal CTP CLR, the one output of the latch STATE 0 or the output of a coincidence AND gate 44, which is enabled by the resetting of the latch STATE 1 and the timing signals (P3+P4)A and (P3+P4)B.

Considering now the operation of the pulse detection arrangement 10, a normal operation where no faults occur will be considered firstly. Prior to the occurrence of the timing pulse (P3+P4)A or the timing pulse (P3+P4)B, the gate 32 is enabled to set the latch STATE 0, and the latches STATE 1 and STATE 2 are in their reset condition. Assuming that the pulses (P3+P4)A and (P3+P4)B are slightly skewed from one another by no more than its pulse length and that the pulse (P3+P4)A occurs first, the pulse (P3+P4)A causes the gate 32 to be de-energized, and thus the gate 34 is energized to set the latch STATE 1. The setting of the latch STATE 1 causes the resetting of the latch STATE 0. Thereafter, when the pulse (P3+P4)B occurs, the gate 40 is enabled to set the latch STATE 2. At this point it should be understood that either one of the pulses (P3+P4)A or (P3+P4)B becoming true enables the gate 34 to set the latch STATE 1.

When the pulse (P3+P4)A terminates, the gate 38 is enabled since the latch STATE 2 is set to cause the gate 36 to be enabled for resetting the latch STATE 1. Thereafter, when the pulse (P3+P4)B terminates, the gate 32 is again enabled to set the latch STATE 0, and the setting of the latch STATE 0 enables the gate 42 for resetting the latch STATE 2, whereby the arrangement 10 of the present invention is returned to its initial condition so that another cycle of operation may be commenced when the next pulse (P3+P4)A or the pulse (P3+P4)B occurs.

Considering now a fault 0 mode of operation where one of the monitored pulses, such as the pulse (P3+P4)B fails to be generated, the initial portion of the operation is the same as the normal operation in that the initial occurrence of the pulse (P3+P4)A causes the gates 32 and 34 to set the latch STATE 1, which in turn resets the latch STATE 0. However, since the pulse (P3+P4)B does not occur, the gate 40 does not become enabled, and thus the latch STATE 2 remains reset. When the pulse (P3+P4)A terminates, the gate 32 is enabled to set the latch STATE 0, since the pulse (P3+P4)B remains at a false condition. Thereafter, when the pulse P1 A or the pulse P1 B occurs, the gate 25 is enabled to cause the gate 23 to be enabled, assuming that both computer processors CCP-A and CCP-B are in on-line operation. The gate 29 being enabled by the gate 23 causes the gate 21 to generate the signal STUCK AT 0 since the latch STATE 1 remains set. As a result, the gate 21 enables the gate 16, which in turn sets the latch STUCK for enabling the gate 12 to generate the signal STUCK AT X. The setting of the latch STUCK causes the gate 29 to remain enabled even after the pulses P1 A and P1 B terminate so that the signal STUCK AT X may be utilized for diagnostic purposes. After the problem is corrected, the date processor units generate the clear signal CTP CLR to reset the latches STATE 1 and STUCK.

Considering now the fault 1 mode where one of the monitored pulses, such as the pulse (P3+P4)B, is generated to its true condition but erroneously remains at that same logic level, the occurrence of the pulse (P3+P4)A causes the latch STATE 1 to be set, and the setting of the latch STATE 1 causes the resetting of the latch STATE 0. Thereafter, when the pulse (P3+P4)B becomes true, the latch STATE 2 is set as hereinbefore described. When the monitored pulse (P3+P4)A terminates, the gate 38 causes the latch STATE 1 to reset via the gate 36. When the pulse (P3+P4)A reoccurs, the gate 44 is enabled to cause the resetting of the latch STATE 2, since the latch STATE 1 is reset. However, it should be noted that the latch STATE 0 remains reset, because one of the monitored pulses — the pulse (P3+P4)B — remains true to prevent the gate 32 from setting the latch STATE 0. Therefore, when one of the pulses P1 A or P1 B occurs during the next cycle of operation of the timing generators of the processors, the gate 25 is enabled to cause the gate 27 to be enabled via the gates 23 and 29 for the purpose of generating the signal STUCK AT 1, whereby the latch STUCK is set via the gate 16. The setting of the latch STUCK causes the gate 12 to be enabled and the gate 29 to continue to be enabled after the pulses P1 A and P1 B terminate so that the gate 12 generates the signal STUCK AT X for indicating the malfunction. Thereafter, the clear signal CTP CLR resets the latch STUCK.

What is claimed is:

1. A detection arrangement for determining the malfunctioning of a pair of timing generators producing a series of synchronously recurring first and second pulses, said arrangement comprising:

zero bi-stable means responsive to the absence of both of said first or second pulses to generate a zero state pulse;

first bi-stable means responsive to either one of said first or second pulses and to said zero state pulse for generating a state one pulse, said state one pulse causing said zero bi-stable device to terminate its zero state pulse;

second bi-stable means responsive to the coincidence of said state one pulse and of said first pulse and said second pulse for generating a state two pulse, said state two pulse causing said first bi-stable device to terminate its state one pulse upon the lack of coincidence of said first and second pulses, said second bi-stable device terminating its state two pulse upon the presence of said zero state pulse or upon the coincidence of said first and second pulses and of the termination of said state one pulse; and logic means for generating a stuck-at-one pulse in response to the absence of said state zero pulse, said state one pulse and said state two pulse after a predetermined time interval, said logic means generating a stuck-at-zero pulse in response to said state one pulse after said predetermined timing interval.

2. A detection arrangement according to claim 1, further including a stuck bi-stable device for generating a stuck signal in response to either said stuck-at-one pulse or said stuck-at-zero pulse.

3. A detection arrangement according to claim 2, means for causing said stuck bi-stable device to remain set after said predetermined timing interval.

4. A detection arrangement according to claim 1, further including zero coincidence gating means responsive to the absence of both of said first or second pulses to cause said zero bi-stable device to generate its zero state pulse.

5. A detection arrangement according to claim 4, further including first coincidence gating means responsive to either one of said first or second pulses and to said zero state pulse for causing said first bi-stable device to generate its state one pulse.

6. A detection arrangement according to claim 5, further including second coincidence gating means responsive to the coincidence of said first pulse and said second pulse and of said state one pulse for causing said second bi-stable device to generate its state two pulse.

7. A detection arrangement according to claim 1, wherein said first and second pulses form part of respective first and second series of sequential timing pulses recurring in synchronism, said first and second pulses being intermediate occurring pulses, said timing interval being determined by a subsequently occurring one of said first and second series of pulses.

8. A detection arrangement according to claim 7, further including a stuck bi-stable device for generating a stuck signal in response to either said stuck-at-one pulse or said stuck-at-zero pulse.

9. A detection arrangement according to claim 8, means for causing said stuck bi-stable device to remain set after said predetermined timing interval.

* * * * *